United States Patent
Dowlatkhah et al.

(10) Patent No.: US 11,039,315 B2
(45) Date of Patent: Jun. 15, 2021

(54) ON-DEMAND SUPER SLICE INSTANTIATION AND ORCHESTRATION

(71) Applicants: AT&T Mobility II LLC, Atlanta, GA (US); AT&T Intellectual Property I, L.P., Atlanta, GA (US)

(72) Inventors: Sangar Dowlatkhah, Alpharetta, GA (US); Zhi Cui, Sugar Hill, GA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 329 days.

(21) Appl. No.: 16/052,239

(22) Filed: Aug. 1, 2018

(65) Prior Publication Data
US 2020/0045548 A1 Feb. 6, 2020

(51) Int. Cl.
*H04W 12/08* (2021.01)
*H04L 12/24* (2006.01)
(Continued)

(52) U.S. Cl.
CPC ......... *H04W 12/08* (2013.01); *H04L 41/0893* (2013.01); *H04L 63/10* (2013.01);
(Continued)

(58) Field of Classification Search
CPC .............................. H04W 12/08; H04L 63/10
See application file for complete search history.

(56) References Cited

U.S. PATENT DOCUMENTS

| | | | |
|---|---|---|---|
| 5,335,268 | A | 8/1994 | Kelly et al. |
| 7,209,964 | B2 | 4/2007 | Dugan et al. |

(Continued)

FOREIGN PATENT DOCUMENTS

| | | |
|---|---|---|
| KR | 101830743 B1 | 4/2018 |
| WO | 2017097227 A1 | 6/2017 |

(Continued)

OTHER PUBLICATIONS

Droste, Heinz, et al. "An adaptive 5G multiservice and multitenant radio access network architecture." Transactions on Emerging Telecommunications Technologies 27.9 (2016): 1262-1270. http://eprints.networks.imdea.org/1463/1 An_Adaptive_5G_Multiservice_Multitenant_Radio_Access_Network_Architecture_2016_EN.pdf.

(Continued)

*Primary Examiner* — Farid Homayounmehr
*Assistant Examiner* — Suman Debnath
(74) *Attorney, Agent, or Firm* — Amin, Turocy & Watson, LLP

(57) ABSTRACT

The provision of additional network resources (e.g., in the form of a dedicated super slice), can be requested on demand a per needed basis when higher capacity or performance is requested to facilitate the delivery of a service, when the delivery of the service cannot be met by a network slice associated with the service. A request for using a super slice can be sent to a management gateway device (mGW). The mGW can send the request for authorization to access the additional resources to a management device that manages the additional resources. Authorization can be granted for the additional resources to be used to facilitate or enable tasks that allow for continued delivery of that service.

20 Claims, 10 Drawing Sheets

(51) Int. Cl.
*H04L 29/06* (2006.01)
*H04N 21/234* (2011.01)
*H04N 21/239* (2011.01)

(52) U.S. Cl.
CPC ....... *H04N 21/234* (2013.01); *H04N 21/2393* (2013.01); *H04L 63/1416* (2013.01)

(56) References Cited

U.S. PATENT DOCUMENTS

| | | | |
|---|---|---|---|
| 7,561,633 | B2 | 7/2009 | Parhi et al. |
| 8,494,035 | B2 | 7/2013 | Bourdoux et al. |
| 9,055,456 | B2 | 6/2015 | Kokku et al. |
| 9,137,105 | B2 | 9/2015 | Pujolle et al. |
| 9,300,537 | B2 | 3/2016 | Liu et al. |
| 9,609,330 | B2 | 3/2017 | Puri et al. |
| 9,621,392 | B2 | 4/2017 | Choi et al. |
| 9,647,732 | B2 | 5/2017 | Zhou et al. |
| 9,723,341 | B2 | 8/2017 | Mun et al. |
| 9,775,045 | B2 | 9/2017 | Li et al. |
| 9,788,211 | B2 | 10/2017 | Zhang |
| 9,892,622 | B2 | 2/2018 | Shaw |
| 9,961,624 | B1 | 5/2018 | Zait |
| 2014/0313898 | A1 | 10/2014 | Yae et al. |
| 2015/0271681 | A1* | 9/2015 | Perez ............... H04W 36/22 370/235 |
| 2016/0353268 | A1 | 12/2016 | Senarath et al. |
| 2016/0360408 | A1 | 12/2016 | Senarath et al. |
| 2017/0093748 | A1 | 3/2017 | Kallin et al. |
| 2017/0257886 | A1 | 9/2017 | Adjakple et al. |
| 2017/0367036 | A1* | 12/2017 | Chen ............... H04L 43/08 |
| 2018/0124660 | A1* | 5/2018 | Zhang ............... H04W 84/02 |

FOREIGN PATENT DOCUMENTS

| | | |
|---|---|---|
| WO | 2017119844 A1 | 7/2017 |
| WO | 2017148101 A1 | 9/2017 |
| WO | 2017197273 A1 | 11/2017 |
| WO | 2018030508 A1 | 2/2018 |
| WO | 2018046006 A1 | 3/2018 |

OTHER PUBLICATIONS

Zhang, Haijun, et al. Network Slicing Based 5G and Future Mobile Networks: Mobility, Resource Management and Challenges. IEEE Communications Magazine 55.8 (2017): 138-145. https://arxiv.org/pdf/1704.07038.

Dighriri, Mohammed, et al. "Data Traffic Model in Machine to Machine Communications over 5G Network Slicing." Developments in eSystems Engineering (DeSE), 2016 9th International Conference, IEEE, 2016. http://researchonline.ljmu.ac.uk/4063/3/Data%20Traffic%20Model%20in%20Machine%20to%20Machine%20Communications%20Over%205G%20Network%20Slicing-Final%20Version.pdf.

Sciancalepore, Vincenzo, et al. "Mobile Traffic Forecasting for Maximizing 5G Network Slicing Resource Utilization." INFOCOM 2017—IEEE Conference on Computer Communications, IEEE, 2017. http://eprints.networks.imdea.org/id/file/20097.

Hossain, Ekram, et al. "5G Cellular: Key Enabling Technologies and Research Challenges." IEEE Instrumentation & Measurement Magazine 183 (2015): 11-21. https://arxiv.org/pdf/1503.00674.

* cited by examiner

ON-DEMAND SUPER SLICE INSTANTIATION AND ORCHESTRATION

TECHNICAL FIELD

The present application relates generally to the field of wireless communication and, more specifically, to the instantiation and orchestration of a super slice of a network.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including services such as enhanced mobile broadband (eMBB) services, massive machine type communications (mMTC), and ultra-reliable and low-latency communications (uRLLC).

In particular, NR access networks will seek to utilize the wireless communications links between donor distributed unit (DU) devices and relay distributed unit (DU) devices (backhaul links), and also utilize the communications links between distributed units and user equipment (UEs) (access links), employing techniques for integrated access and backhaul (IAB), which is not without challenges.

In the upcoming 5G and next-gen mobile networks, network slices, a combination of virtual network functions (VNFs) instantiated on default hardware, are to be implemented to handle dedicated services utilized by customer entities (e.g., subscribers, or large enterprises). These network slices are made to perform specific tasks associated with the dedicated services. However, within the service infrastructure, there might be events or conditions that arise in which a network slice's capabilities will not be able to accommodate a full rendering of a dedicated service.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
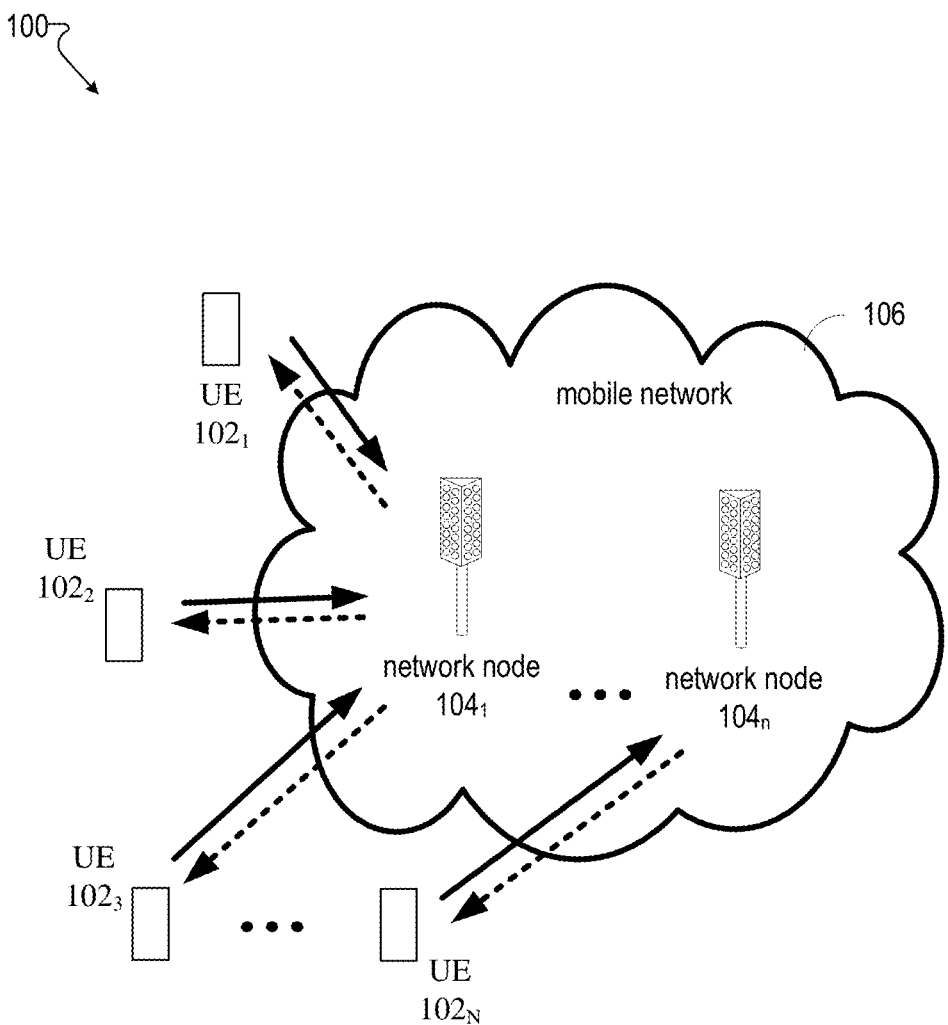
FIG. 1 illustrates an example wireless communication system having a network node device (also referred to herein as a network node) and user equipment (UE), in accordance with various aspects and example embodiments of the subject disclosure.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., network management device, gateway device, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 10.

In the upcoming 5G and other next-gen networks, network services are slated to be handled by decentralized virtual network functions (VNFs) that are instantiated either for a specific service, or group of services. However, there are conditions or events that arise that can require additional resources that exceed the capabilities that can be provided by a particular network slice. The present patent application relates to an on-demand super slice instantiation and orchestration, wherein the provision of additional network resources, in the form of a dedicated super slices to address such additional requirements on a per needed basis should conditions or events arise, can be accessible on-demand. For example, when higher capacity or performance is desired to deliver a service (e.g., can facilitate delivery of a service, including to meet a level of service, or to more efficiently deliver a service), and delivery of the service cannot be met, or cannot be met efficiently, by a network slice associated with the service, an authorization request for using a super slice can be sent to a management gateway device (mGW). The mGW can search for an appropriate super slice, including determine the location on the network of the super slice, and can send a request for authorization to access the super slice to a management device that manages the super slice. Authorization can be granted for the super slice to be accessed (e.g., used) to facilitate or enable tasks that allow for continued delivery of that service (e.g., delivery at a level of service). The super slice can comprise a combination of resources for performing a task, and the super slice can complement more than one type of network slice. Once the condition or event has passed, and the super slice is no longer being used (e.g., no longer desired to facilitate performance of a task related to the service), it can be released, to be reused, or re-accessed, later.

FIG. 1 illustrates an example wireless communication system 100 (also referred to as wireless system 100, mobile system 100, mobile communications system 100) in accordance with various aspects and embodiments of the subject disclosure. In example embodiments (also referred to as non-limiting embodiments), wireless communications system 100 can comprise a mobile (also referred to as cellular) network 106, which can comprise one or more mobile networks typically operated by communication service providers. The wireless communication system 100 can also comprise one or more user equipment (UE) $102_{1-N}$ (also referred to as UE 102). UE $102_{1-N}$ can communicate with one another via one or more network node devices (also referred to as network nodes) $104_{1-N}$ (referred to as network node 104 in the singular) of the mobile network 106. The dashed arrow lines from the network nodes $104_{1-N}$ to the UE $102_{1-N}$ represent downlink (DL) communications and the solid arrow lines from the UE $102_{1-N}$ to the network nodes $104_{1-N}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of disparate networks implementing various transmission protocols, including but not limited to: cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communications system 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB (gNB) device, which provides NR user plane and control plane protocol terminations towards the UE, and connects to the 5G core.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Figure 2:
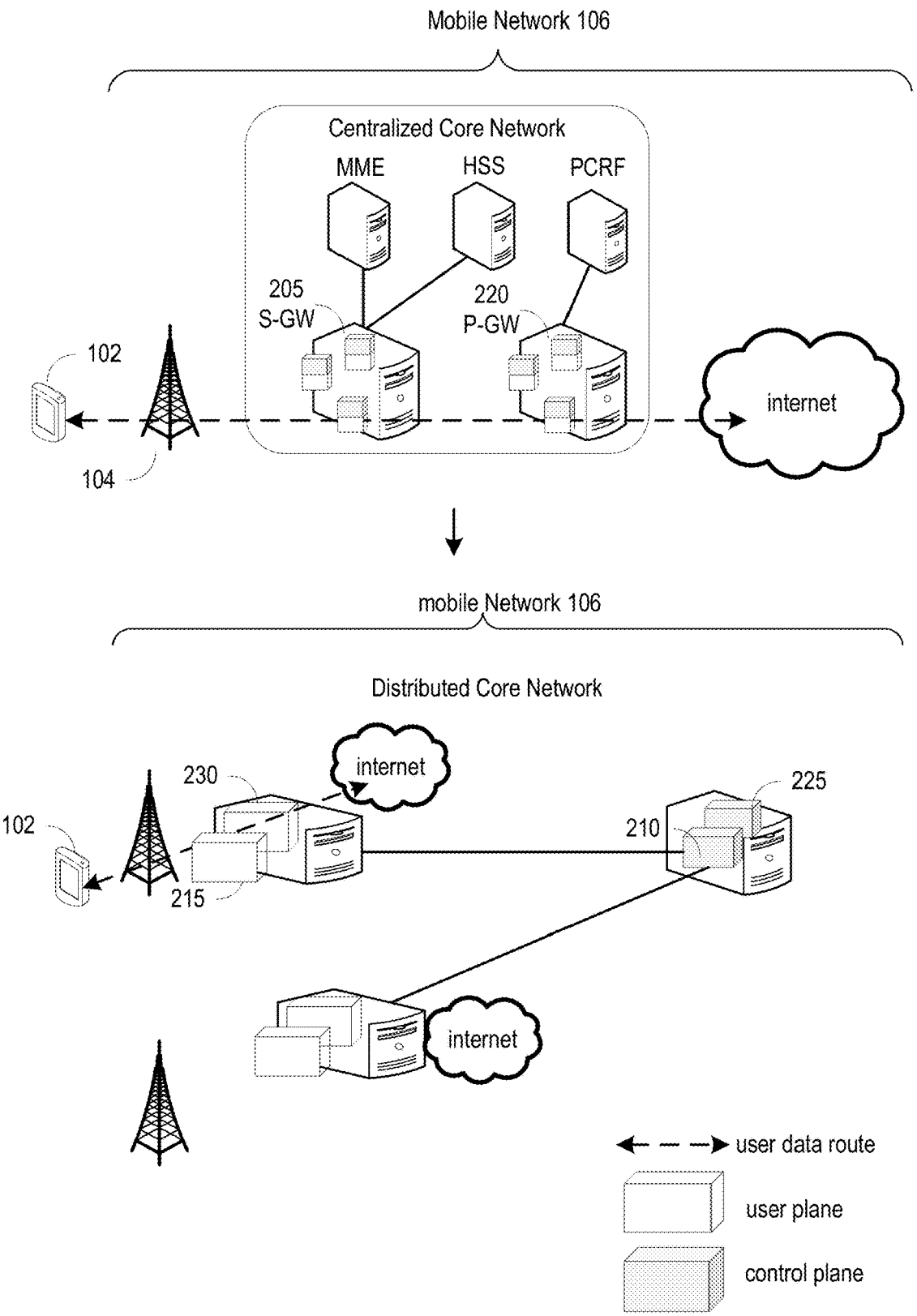
FIG. 2 illustrates an example centralized core network (CN) in comparison with a distributed CN implementing control plane and user plane separation, in accordance with various aspects and example embodiments of the subject disclosure.

Referring now to FIG. 2, the upcoming 5G access network can also employ an architecture in which a user plane and control plane are separate, wherein complex control plane functions are abstracted from forwarding elements, simplifying user plane operations by relocating control logic to physical or virtual servers. Each plane carries a different type of traffic and can be implemented as overlay networks that runs independently on top of one another, although supported by its infrastructure. The user plane (sometimes known as the data plane, forwarding plane, carrier plane, or bearer plane) carries the network user traffic, and the control plane carries signaling traffic. Typical control-plane functionality includes capabilities such as the maintenance of location information, policy negotiation and session authentication. In example embodiments, the planes can be implemented in the firmware of routers and switches. As shown in FIG. 2, a mobile network (e.g., mobile network 106) with a centralized core network (CN) can be decentralized, resulting in a distributed CN, which acts as a controller in a mobile communication network, and performs underlying tasks required for providing mobile communication services (e.g., user authentication, data transmission, etc.). To abstract the network resources from the underlying physical hardware, the control plane and user plane are separated, abstracting the network resources from the underlying physical hardware. This separation allows user-plane functionality to move to the network edge, and management functionality to remain at the core. For example, as shown in FIG. 2, the serving gateway (S-GW) 205 in a centralized CN can, in a distributed CN, be separated into a S-GW-C 210 for the control plane and S-GW-U 215 for the user plane, wherein the user plane functionality is closer to the network edge. Likewise, as shown in FIG. 2, the Packet Data Network (PDN) gateway (P-GW) 220 can be separated into P-GW-C 225 for the control plane, and the P-GW-U 230 for the user plane, with the S-GW-U 215 and P-GW-U 230 functionality being moved closer to the edge of the network. In this distributed CN, the physical core can be virtually separated and relocated in the network into multiple virtual core networks using virtualization technology. This software-defined networking (SDN) approach, can be complimentary to a network functions virtualization (NFV) approach, in which a virtual network function (VNF) is responsible for handling specific network functions (NFs) that run on one or more virtual machines (VMs) on top of the hardware networking infrastructure (e.g., routers, switches, etc.). Individual VNFs can be connected or combined to offer a particular network communication service. Both SDN and VNF can facilitate the implementation of network slicing (described further below).

Figure 3:
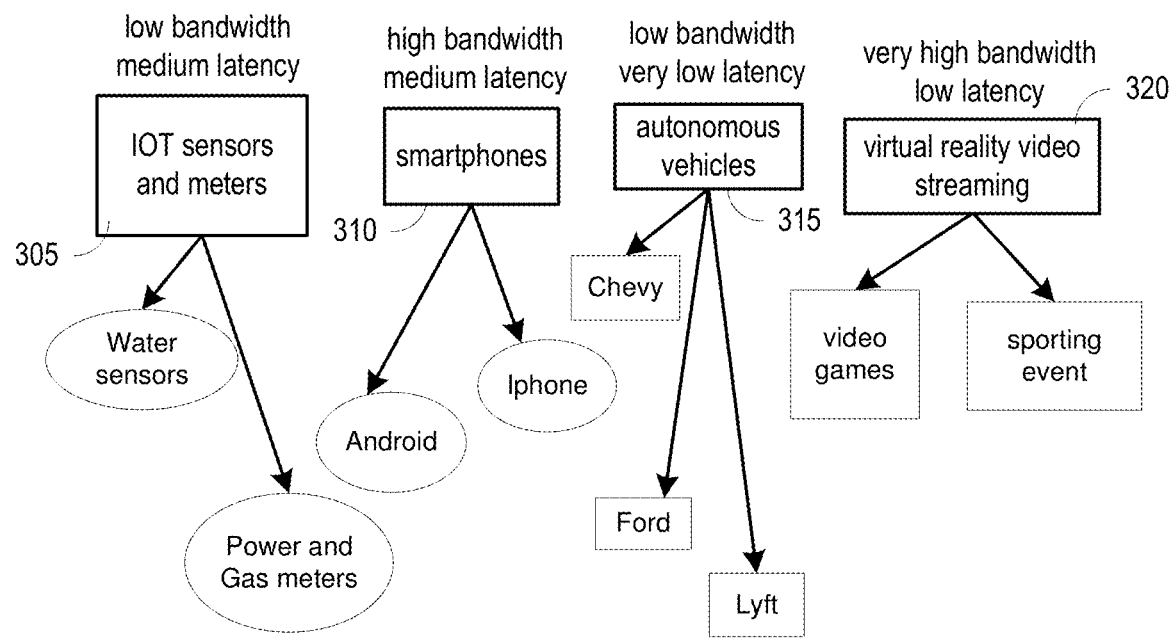
FIG. 3 illustrates the bandwidth and latency requirements for different communication services, in accordance with various aspects and example embodiments of the subject disclosure.

In 5G and other next generation networks, network services are handled by decentralized virtual network functions, called network slices, that are instantiated either for a specific, dedicated service, or group of services, utilized by subscribers or large enterprises. These slices are made to perform specific tasks depending on the location, quality of service (QoS) and capacity of a given service. Thus, instead of having one network that serves all devices on the network and performs all services, a single physical network can be sliced into multiple virtual networks that can draw from both CN and radio access network (RAN) resources to provide a specific service. In this manner, network slices can be specifically configured to support a multitude of use cases and new services. Each use case involves performance requirements that vary enormously. As shown in FIG. 3, the bandwidth and latency related to each service can vary. IOT sensors and meters 305 might require service that is low bandwidth and medium latency. Smartphones 310 might require high bandwidth and medium latency. Autonomous vehicles 315 rely on V2X (vehicle-to-anything) communications which requires low latency but not necessarily a high bandwidth. Virtual reality video streaming 320 that supports video games and live sporting events might require a very high bandwidth, but low latency. As such, different use cases place different requirements on the network in terms of functionality. Each specific service requires different resources, receiving a specific set of optimized resources and network topology that covers certain service level agreement specified factors for delivering the service, including such factors as such as connectivity, speed, and capacity. For example, for autonomous vehicle services 320, Ford, Lyft, or Chevy might each have a different service level agreement with a network provider to support their autonomous vehicle communication services.

Figure 4:
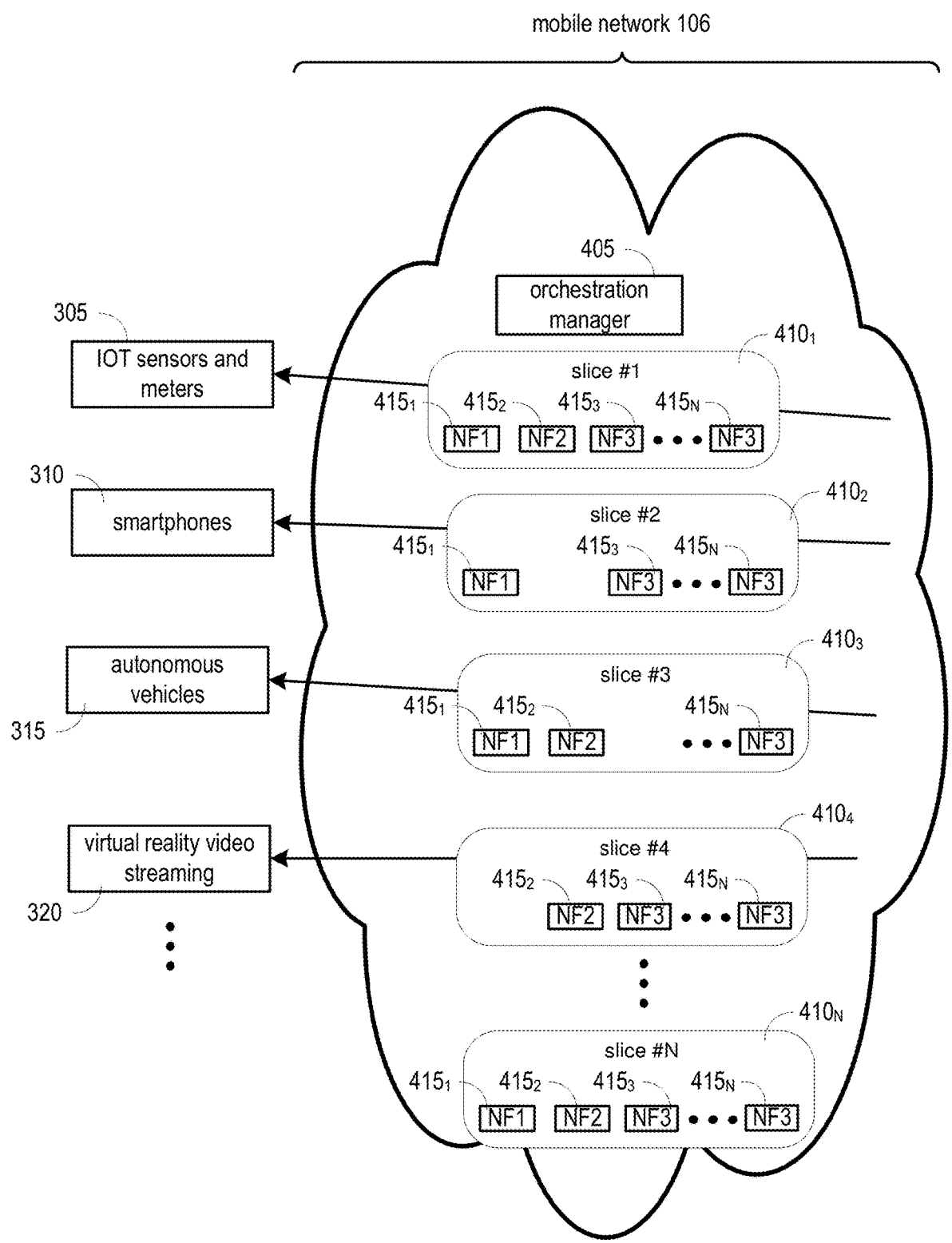
FIG. 4 illustrates an example of network slices, each having combinations of network functions, in accordance with various aspects and example embodiments of the subject disclosure.

Referring now to FIG. 4, a service orchestration manager 405 can instantiate network slices $410_{1-N}$ of the network comprising combinations of vNFs (virtual network functions (NFs)) on default hardware (HW) in order to reduce the network complexity, and provide capital savings on proprietary HW and software. Each network slice can be instantiated, depending on, for example, the location (such as dedicated slice close to a large customer enterprise) or quality of service (e.g., high QoS slice for a premium service). These slices are part of cloud network running on a default hardware with given limitations such as number of dedicated processors and memory, etc. As shown in FIG. 4, with network slicing, each of these services can be delivered over the same common physical network on multiple virtual network slices to optimize use of the physical network. A slice #1 $410_1$ can be instantiated to support IOT meters and sensors 305. A slice #2 $410_2$ can serve smartphones. A slice #3 $410_3$ can serve autonomous vehicles 315. A slice #4 $410_4$ can support virtual reality video streaming 320. N number of slices in the network (e.g., slice #N $410_N$) can be instantiated to support other services. Each network slice can comprise an independent set of logical, network functions NFs $415_{1-N}$ (also referred to herein as tasks) that support the requirements of particular services (e.g., the term "logical" can refer to software), with some NFs that can be shared across multiple slices (e.g., NF1 $415_1$ is common across the slices), while other NFs are tailored to a particular network slice. An NF can comprise network nodes functionality (e.g. session management, mobility management, switching, routing functions) which has defined functional behavior and interfaces. Thus, NFs can be implemented as a network node (e.g., network node 104) on a dedicated hardware or as virtualized software functions. The service orchestration manager device 405 can perform selection functions that pair the resources and network topology (e.g., RAN and fixed access, terminal, transport, and CN resources) needed for the specific service and traffic that uses the slice. In this way, functions such as speed, capacity, connectivity and coverage can be allocated to meet the specific demands of each use case. Not only can a network slice be specifically instantiated for certain services, it can be reused.

However, in the complex service infrastructure there are functionalities that require a large amount of data to be processed and stored for a certain amount of time, which in most cases occur during certain service processes. In certain circumstances, a given slice must perform a certain activity or calculation, such as using a large orchestration of repositories, or a security related activity in case of emergency cyber attack on a service. Within any service infrastructure, there are exceptions whereby a slice's capability will not be able to accommodate a full rendering of such services, including in the case of emergencies, or in case of a need to perform a very specialized activity, such as a large calculation of data within a number of databases, or any activity which usually is out of a network slice's usual scope.

In example embodiments in accordance with the present application, to be able to accommodate such activities, tasks, and services in a cloud environment without creating extremely large slices for each service, dedicated, specialized slices, referred to herein as "super slices" that can perform such processing/capacity rigorous activity, including being able to address such requirements on a per needed basis. In example embodiments, a super slice can be located anywhere on the network and can be reached by the managing gateway (mGW). For example, the service architecture can call upon a repository such as "BigData super slice" to furnish an on-demand source of statistical data for calculation of past and future instances of an event, in order to carry out an activity, such as predicting a solution for the service, such as weather prediction or stock exchange.

Specific activities, or tasks, can be assigned to dedicated super slices that are instantiated to serve existing slices, and can be dynamically assigned to perform specific tasks depending of the priority and availability. Super slices can comprise, for example, a number of network slices. The super slice can comprise, for example, resources that are underutilized. For example, if a computing resource on the network is only being used at 25% capacity, a super slice manager can tap into the other 75% for use by the super slice. Extra storage, for example, extra storage with analytic capability, can also be used as part of a super slice.

Super slices can also comprise, for example, databases with sensitive information. As an example, it might comprise intelligence and police databases useful for identifying suspects (e.g., criminal or terrorist databases) that are normally inaccessible.

Figure 5:
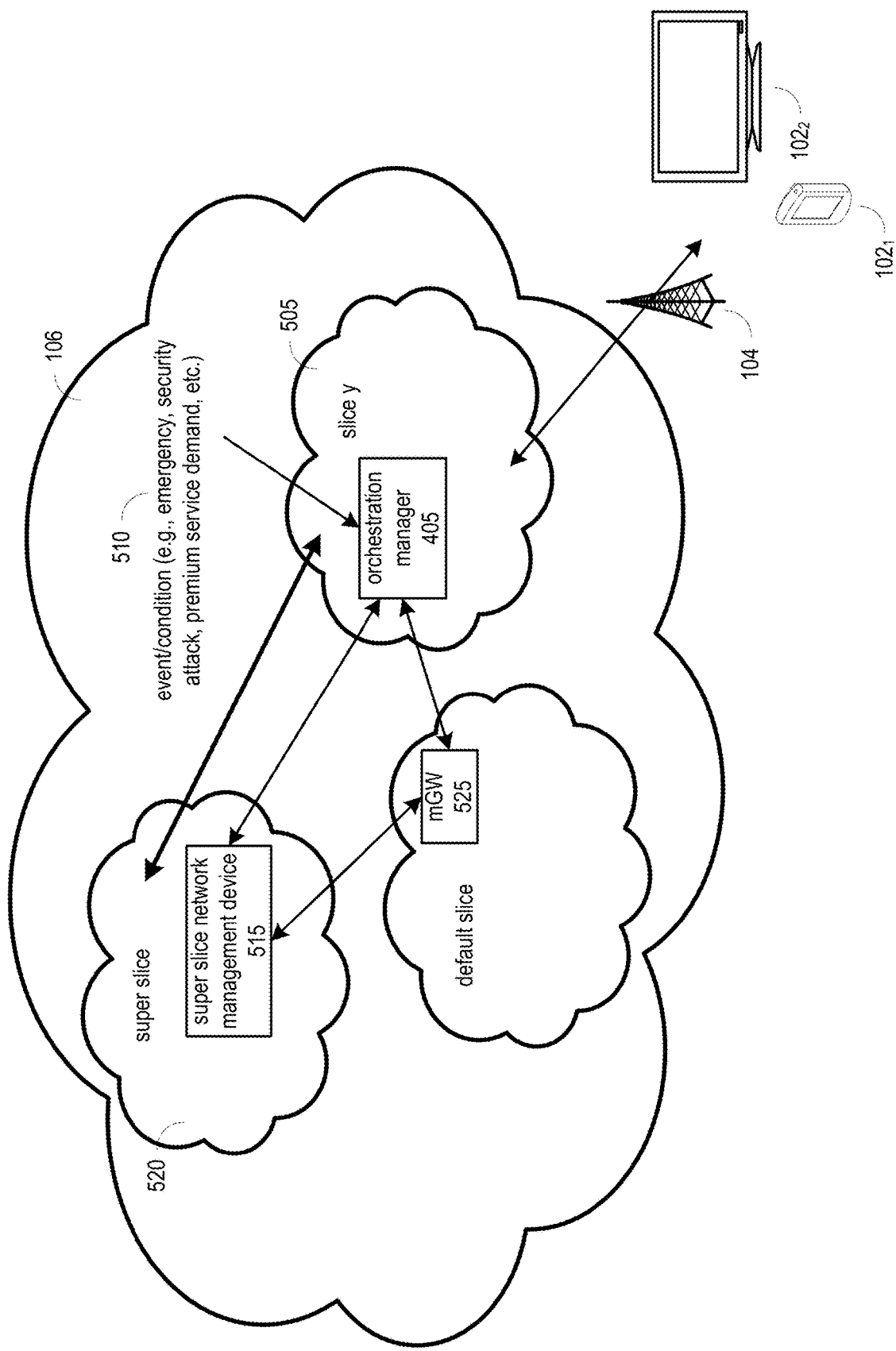
FIG. 5 illustrates an example system in which a super slice can be requested in response to a condition (or event), in accordance with various aspects and example embodiments of the subject disclosure.

Referring now to FIG. 5, a system for providing super slice resources is illustrated, in accordance with example embodiments and aspects of the subject disclosure. A slice of the network (slice y 505) can be instantiated (e.g., instantiated by an orchestration manager 405) to support a regular service, wherein the network slice comprises network elements performing functions (e.g., NFs 415) that enable the communication service. Additionally, the orchestration manager 405 can, in addition to, or instead of, instantiating network slices, access default slices for performing certain tasks or functions, wherein the default slice can be managed by a managing gateway device (mGW 525).

If a condition 510 arises such that the network slice is unable to support the regular communication service at a level of service, a request (e.g., authorization request) can be sent by a network management device managing the network slice (e.g., orchestration manager 405) requesting access to the super slice 520. As mentioned above, the super slice 520 can be a dedicated, high performance network slice. A condition 510 can comprise, for example, an emergency event, cyber-security breach (e.g., distributed denial of service attack), sudden demand for access to a repository, numerous queries, request for premium services, etc. A request for premium services can be, for example, a request (e.g., by a user or customer device) to change the quality of a video being received from standard definition to high definition. A request for premium services can relate to, for example, a request for premium security services. Regular security services might involve tasks such as, for example, monitoring a hallway, and transmitting video to a particular location for monitoring. Regular services might also relate to alerting of a presence (e.g., based on a motion detector). If a condition or event, such as a break-in, shooting, or terrorist attack occurs, the security system might be triggered to request premium services that involve tasks such as facial recognition requiring access to databases containing profiles of known suspects, etc. In these instances, the network slice might be unable to support the regular communication service (e.g., security monitoring and alerting).

The request for use of a super slice can be sent to, for example, a managing gateway device (mGW) 525. In example embodiments, the mGW can create a super slice from available resources on the network (e.g., obtain access to databases, obtain access to un-used capacity, etc.) to meet the super slice request. The mGW can determine the appropriate network resources (e.g., the super slice) that can address the condition 510 (e.g., determining which super slice is capable of satisfying the request, and the location of the super slice). The mGW can then transmit a request (e.g., or forward the request from the orchestration manager 405) to a super slice network management device 515 that manages the super slice 520. The request can be, for example, a request to lease the right to use the super slice 520. The mGW 525 can grant access to super slice 520 on demand according to a service level agreement (SLA), smart billing. For example, dedicated service charges can be different when a super slice 520 is used, depending of supply and demand of the super slice's capacity and availability. If the super slice is being demanded during a peak period, for example, a higher amount can be billed for using the super slice. In example embodiments, the resources used by the super slice can belong to a variety of entities (e.g., Home Box Office (HBO)'s servers, Cricket Wireless's relay devices, etc.), and use by the super slice to meet the request can be billed back to the requesting party (e.g., party using the communications services). The mGW 525 can also create additional capacity (depending on policy and preferences) by reducing other services' usage of the super slice 520.

In other example embodiments, the super slice network management device 515 can authorize a grant of access to the super slice 520 (e.g., based on provisioning policy, and other parameters). The super slice network management device 515 can transmit that authorization to the orchestration manager 405.

A new connection enabling the super slice 520 to be accessed to facilitate delivery of the service can be set up, allowing the additional resources of the super slice 520 to be used to meet the demands brought on by the condition 510.

As an illustrative example, while a service is running within a slice of the network, an emergency might occur, such as a major security event (e.g., a distributed denial of service (DDoS) attack). When higher capacity/performance is needed for premium/emergency services such as this security attack, and an existing slice does not have the resources to address the new condition 510, a request for using the super slice (dedicated high-performance slice) can be sent to the mGW device (e.g., mGW 525). The mGW can send a request for leasing the right to use the super slice, wherein the super slice can be located anywhere on the network and can be reached by the mGW. According to the appropriate provisioning policy and other parameters, access to use super slice is granted, and a new connection to the super slice is established to address the premium/emergency services condition 510. If different resource used by the super slice belong to other entities, those other entities can be compensated for the use.

The availability and provisioning of a super slice can reduce the overall CAPEX and OPEX (e.g., an operating expense, operating expenditure, operational expense, operational expenditure or OPEX is an ongoing cost for running a product, business, or system. Its counterpart, a capital expenditure (CAPEX), is the cost of developing or providing non-consumable parts for a product or system) of the CN by creating more simplified network slices by assigning more complex tasks to super slices. For instance, if there is a super security slice, there is no need to add every permutation of every security algorithm into every network slice. When needed, a request can be made to access the super slice for security. Granting access to super slices for to all the services, as needed (e.g., dynamically) can also lead to reduction in cost of operation and maintenance of the network, and increased capability and quality of all the services in and across the network. Use of a super slice can also serve to improve security. For example, sensitive information needed for a task (e.g., FBI database) can contain information that is sensitive and normally inaccessible without proper authorization from police or law enforcement. Instead of a variety of communications services having default access to the database, access being contained to a super slice can result in improved security due to the limited access.

Figure 6:
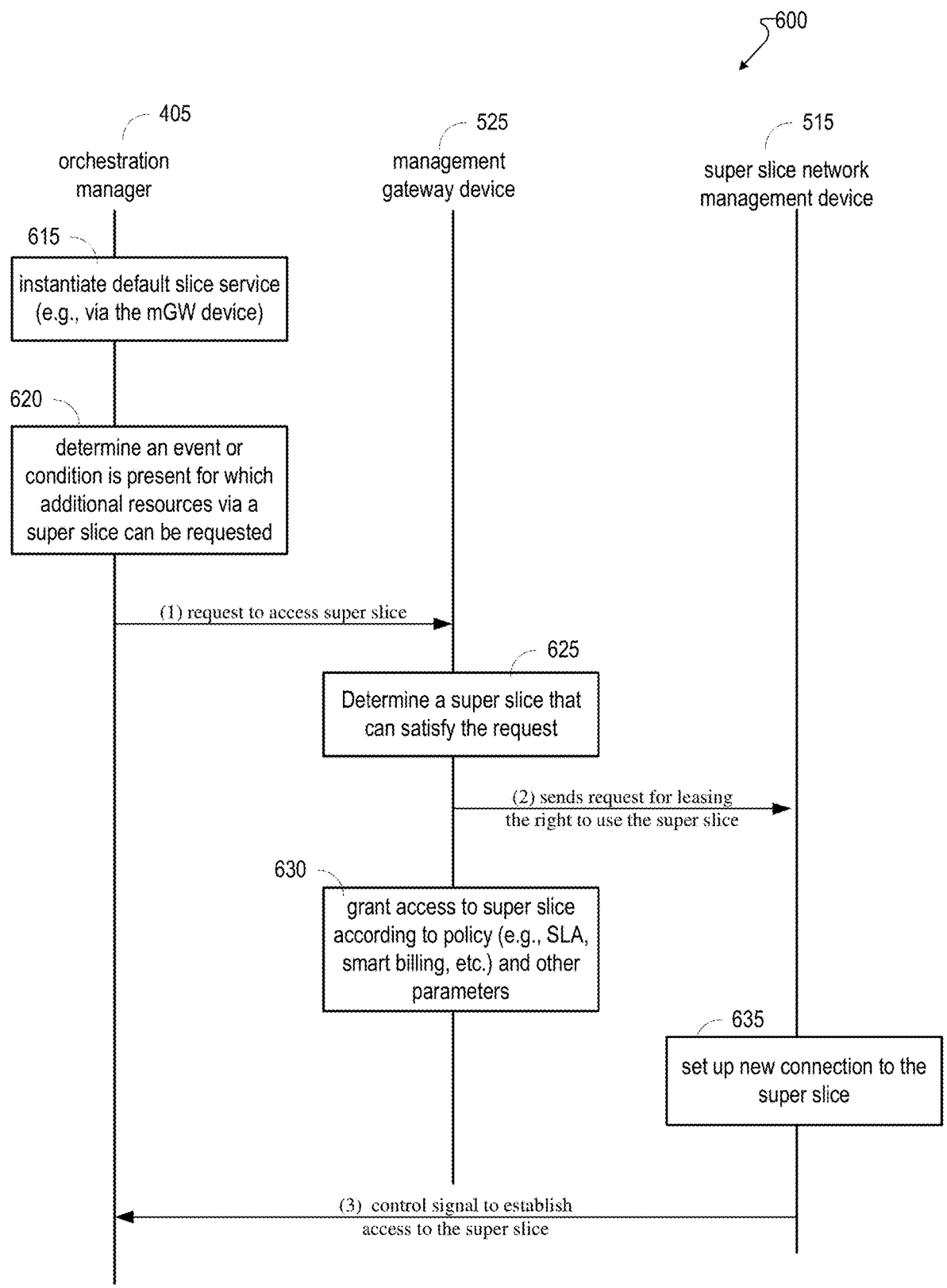
FIG. 6 illustrates a message sequence diagram for requesting and authorizing a super slice, in accordance with various aspects and example embodiments of the subject disclosure.

FIG. 6 illustrates an example sequence diagram for requesting additional resources via a super slice (e.g., super slice 520), involving an orchestration manager 405, a management gateway device (mGW 525), and a super slice network management device (e.g., super slice network management device 515. An orchestration manager 405 can, at block 615, instantiate a default network slice service for a communication service associated with the orchestration manager 405. This can be done with assistance from a mGW device 525 that can facilitate access to a default network slice for the communication service associated with the orchestration manager 405.

At block 620, the orchestration manager 405 might have detected, determined, or be made aware of, a condition 510 that arises for which additional resources from a super slice 520 can be requested, whereby the default network slice is unable to maintain the communication service (or an aspect of the communication service, or a level of quality of the communications service) or requires an additional task related to the communication service, due to the condition 510.

At sequence (1), the orchestration manager 405 can send a request to use a super slice to the mGW 525. The mGW 525, can at block 625 determine a super slice (e.g., super slice 520) capable of satisfying the request. Additionally, the mGW can assemble a super slice, from available resources, to meet the request. The super slice 520 can be located anywhere on the network, and can be determined by the mGW 525. At sequence (2), the mGW 525 can send a request for leasing the right to use the super slice 520 to the super slice network management device 515. The request can include the identity of the orchestration manager 405 that originated the request to access the super slice 520.

At block 630, the mGW 525 can grant access to the super slice 520 on demand according to a provisioning policy, such as a subscriber level agreement (SLA), smart billing (dedicated services can be charged differently when a super slice is used, depending on the supply and demand of the super slice and its capacity and availability). The mGW 525 can also create additional capacity (depending on policy and preferences) by reducing other service usage of SS.

At block 635, the mGW 525 can set up a new connection to the super slice 520 for the orchestration manager 405 to access. This can entail a connection establishment process with the orchestration manager 405 in which control signaling can be used to establish the access to the super slice 620, as shown in sequence (3) of FIG. 6.

In alternative example embodiments, the grant to access the super slice can be performed by the super slice network management device 515 (e.g., block 630 can be performed by the super slice network management device 515), wherein, for example, the provisioning policy was sent by the orchestration manager 405 and forwarded to the super slice network management device 515.

Figure 7:
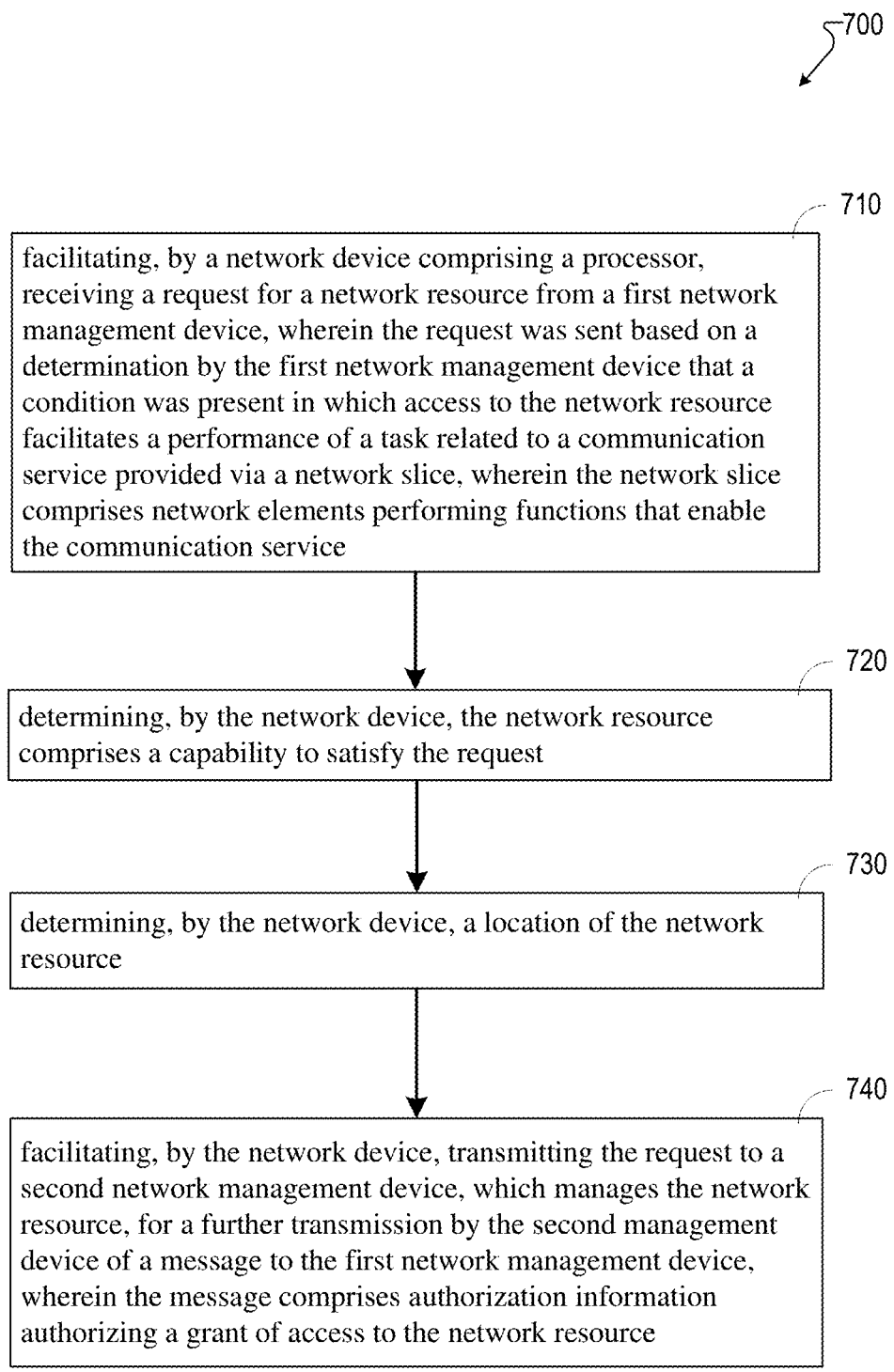
FIG. 7 illustrates an example method for requesting an authorizing a super slice, in accordance with various aspects and example embodiments of the subject disclosure.

FIG. 7 illustrates a flow diagram of operations that can be performed, for example, by a managing gateway device (e.g., mGW 525), in accordance with example embodiments of the subject patent application.

At block 710, the operations can comprise, facilitating, by a network device comprising a processor (e.g., mGW 525), receiving a request for a network resource (e.g., super slice 520) from a first network management device (e.g., orchestration manager 405), wherein the request was sent based on a determination by the first network management device that a condition (e.g., condition 510, emergency, large query for information, cyber attack (e.g., denial of service attack), premium service request, etc.) was present in which access to the network resource facilitates (e.g., can facilitate, is capable of facilitating, is operable to facilitate, etc.) a performance of a task (e.g., streaming video data for the communication service at a higher rate of transmission than a current rate of transmission, analysis of information, access and retrieval of data stored on a repository, inspection of data to detect a security risk, etc.) related to a communication service (e.g., provision of video data, V2X communications, emergency notifications, etc. (see, e.g., FIG. 3)) provided via a network slice, wherein the network slice comprises network elements performing functions (e.g., network functions NF $415_{1-N}$) that enable the communication service.

At block 720, the operations can comprise determining, by the network device, the network resource comprises a capability to satisfy the request (e.g., the network device can search in network locations for a super slice capable of satisfying the request).

At block 730, the operations can comprise determining, by the network device, the location of the network resource.

At block 740, the operations can comprise facilitating, by the network device, transmitting the request (which can comprise a request to lease the network resource) to a second network management device (e.g., super slice network management device 515), which manages the network resource, for a further transmission by the second management device of a message to the first network management device, wherein the message comprises authorization information authorizing a grant of access to the network resource. The authorization information can be based on a provisioning policy relating to the use of the network resource. The provisioning policy can comprise a subscriber level agreement representative of a billing arrangement associated with the network management device. The subscriber level agreement can specify a quality of service level to be provided by the communication service to a customer entity.

The network resource (e.g., super slice 520) can facilitate maintenance of a quality of service specification related to the communication service, for example, it can facilitate fulfillment of a bandwidth specification related to the communication service, or a capacity related to the communication service, or a quality of service (QoS) related to the communication service.

Figure 8:
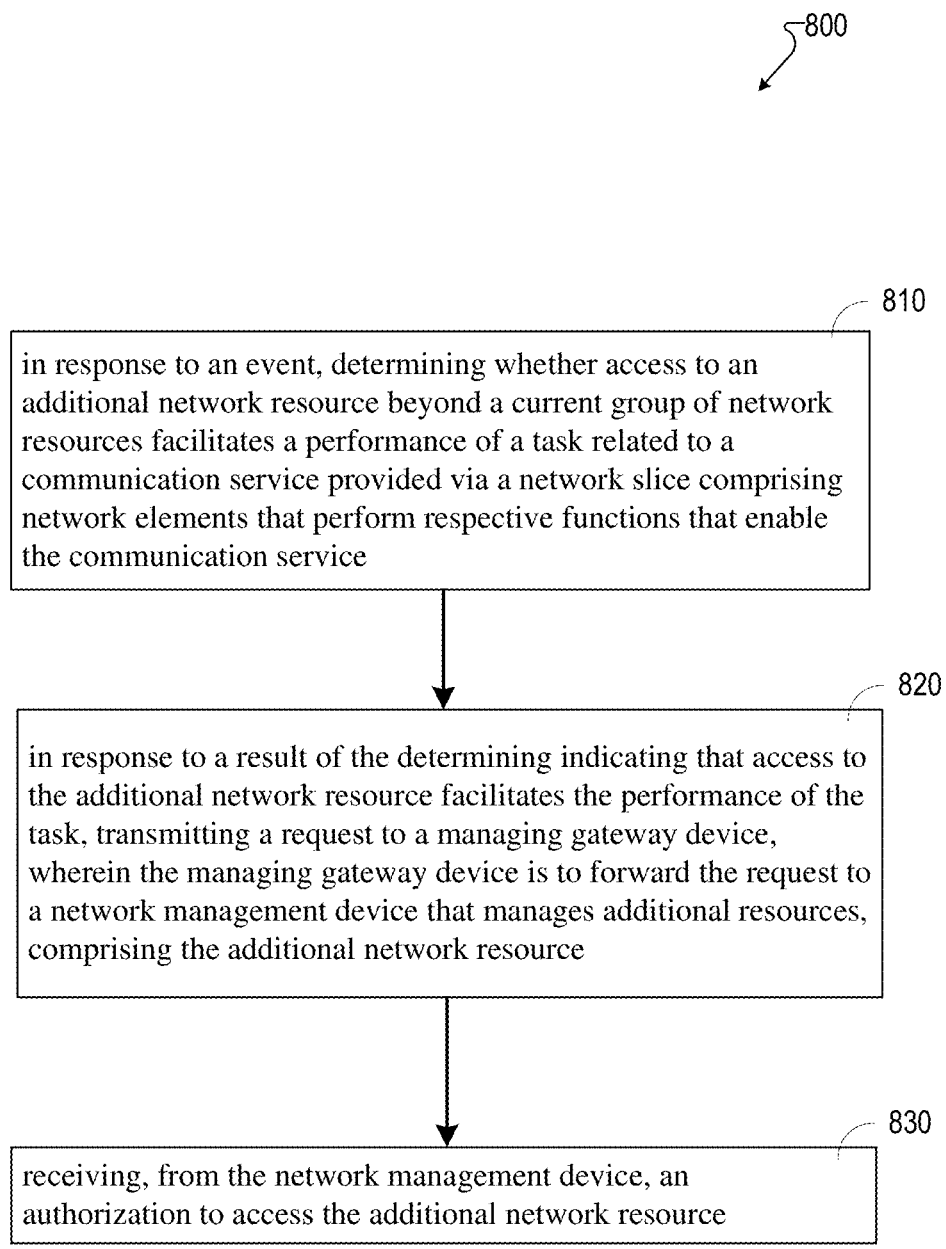
FIG. 8 is another illustration of an example method for requesting and authorizing a super slice, in accordance with various aspects and example embodiments of the subject disclosure.

FIG. 8 illustrates another a flow diagram of operations that can be performed, for example, network management device (e.g., orchestration manager 405), in accordance with example embodiments of the subject patent application.

At block 810, the operations can comprise, in response to an event, determining whether access to an additional network resource (e.g., super slice 520) beyond a current group of network resources (e.g., network resources of a default slice) to facilitate a performance of a task related to a communication service provided via a network slice (e.g., default slice) comprising network elements that perform respective functions that enable the communication service. The communication service can be, for example, provision of video data, V2X communications, emergency notifications, etc. (see, e.g., FIG. 3). The event can be, for example, an emergency, condition 510, a large query for information, cyber attack (e.g., distributed denial of service attack), premium service request, etc. The task can be, for example, streaming video data for the communication service at a higher rate of transmission than a current rate of transmission, analysis of information, access and retrieval of data stored on a repository, inspection of data to detect a security risk, etc. Determining whether access to the additional resources facilitates (e.g., can facilitate, is capable of facilitating, is operable to facilitate, etc.) performance of the task can comprise determining whether the network elements of the network slice are capable of carrying out the task in accordance with a level of service (e.g., can maintain a specified quality of service (QoS), bandwidth level, etc.).

At block 820, the operations can comprise, in response to a result of the determining indicating that access to the additional network resource facilitates the performance of the task, transmitting a request to a managing gateway device (e.g., mGW 525), wherein the managing gateway device is to forward the request to a network management device (e.g., super slice network management device 515) that manages additional resources, comprising the additional network resource. The managing gateway device can forward the request based on a determination of capabilities of the additional resources managed by the network management device.

At block 830, the operations can comprise receiving, from the network management device, an authorization to access the additional network resource. The authorization can be based on a provisioning policy relating to the use of the network resource. The provisioning policy can comprise a subscriber level agreement representative of a billing arrangement associated with the network management device. The subscriber level agreement can specify a quality of service level to be provided by the communication service to a customer entity.

Figure 9:
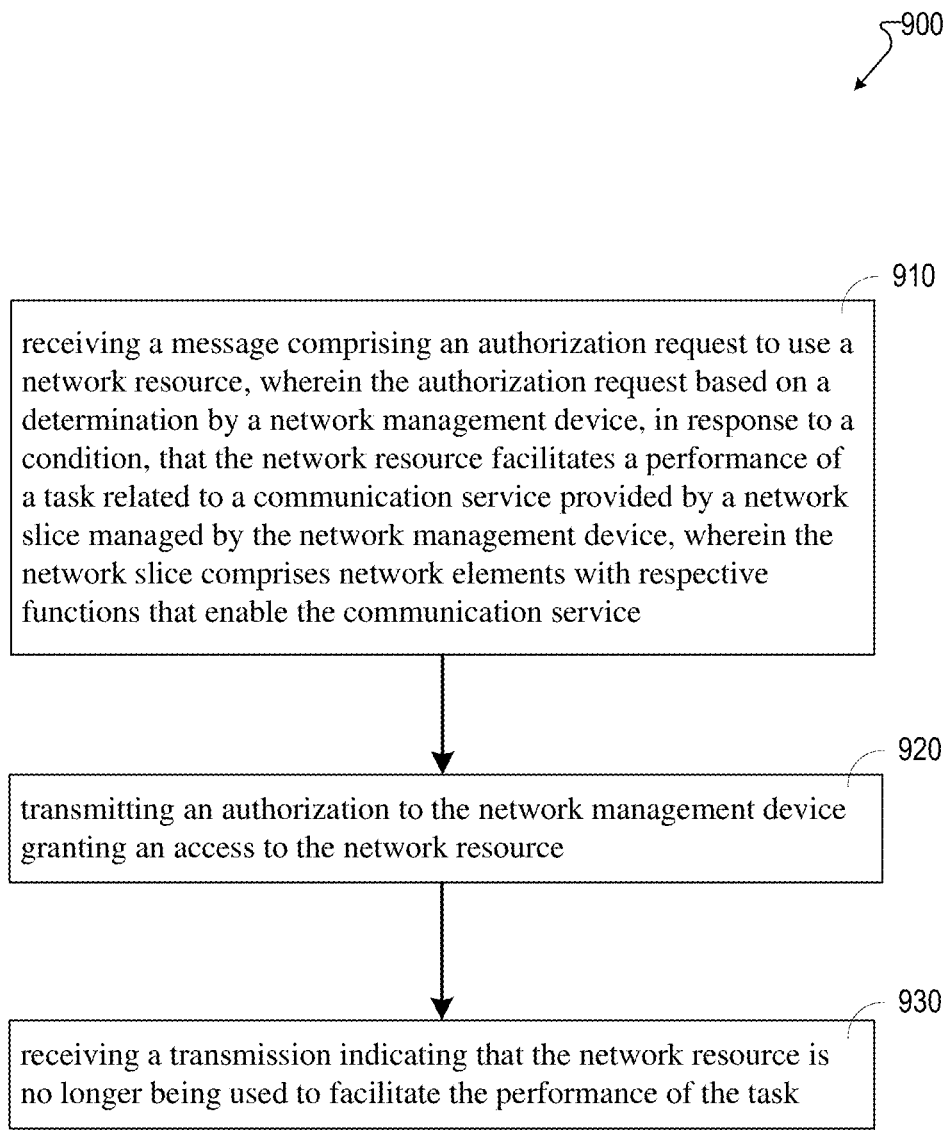
FIG. 9 illustrates another example method for receiving a request for and authorizing access to a super slice, in accordance with various aspects and example embodiments of the subject disclosure.

FIG. 9 illustrates another flow diagram of a method that can be performed by, for example, super slice network management device 515, in accordance with example embodiments of the subject application.

At block 910, the method can comprise receiving a message comprising an authorization request to use a network resource (e.g., super slice 520), wherein the authorization request based on a determination by a network management device (e.g., orchestration manager 405), in response to a condition, that the network resource facilitates (e.g., can facilitate, is capable of facilitating, is operable to facilitate, etc.) a performance of a task related to a communication service provided by a network slice managed by the network management device, wherein the network slice comprises network elements with respective functions that enable the communication service. The communication service can be, for example, provision of video data, V2X communications, emergency notifications, etc. (see, e.g., FIG. 3). The task can be, for example, streaming video data for the communication service at a higher rate of transmission than a current rate of transmission, analysis of information, access and retrieval of data stored on a repository, inspection of data to detect a security risk, etc. The condition can be, for example, an emergency, condition 510, a large query for information, cyber attack (e.g., distributed denial of service attack), premium service request, etc. The message can be received from a managing gateway device (e.g., mGW 525) in response to the managing gateway device determining that the network resource (e.g., super slice) is equipped to facilitate the performance of the task.

At block 920, the method can comprise transmitting an authorization to the network management device granting an access to the network resource.

At block 930, the method can comprise receiving a transmission indicating that the network resource is no longer being used to facilitate the performance of the task. Thus, for example, when the super slice (e.g., super slice 520) is determined to be no longer needed, it can be released for reuse later.

The transmitting the authorization can be based on a provisioning policy relating to the use of the network resource. The provisioning policy can comprise a subscriber level agreement representative of a billing arrangement associated with the network management device. The subscriber level agreement can specify a quality of service level to be provided by the communication service to a customer entity.

Figure 10:
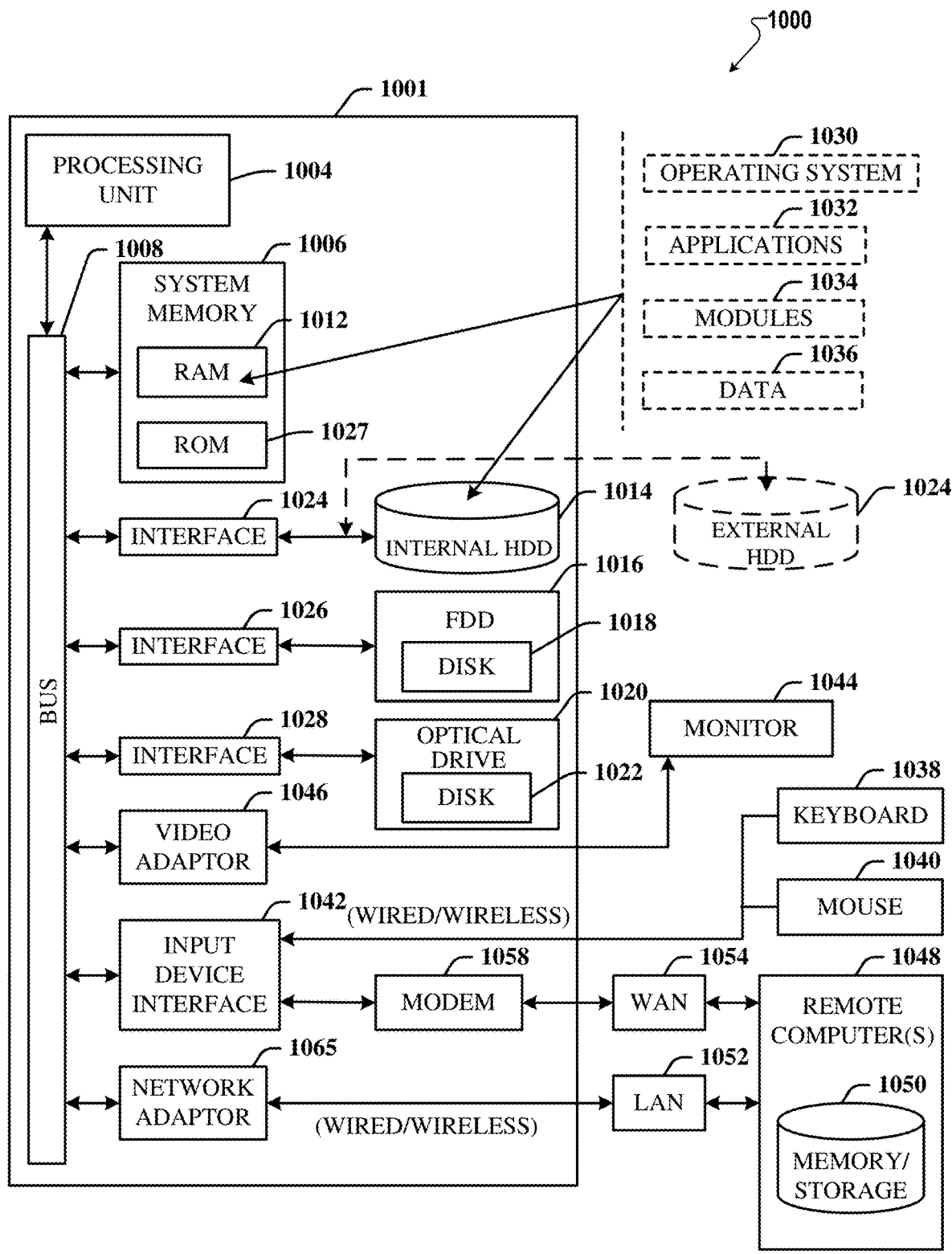
FIG. 10 illustrates an example block diagram of a computer that can be operable to execute processes and methods, in accordance with various aspects and embodiments of the subject disclosure.

Referring now to FIG. 10, there is illustrated a block diagram of a computer 1000 operable to execute the functions and operations performed in the described example embodiments. For example, orchestration manager 405, mGW 525, and super slice management device 515 can contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the functions and operations described herein. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein, devices can include a computer 1000, the computer 1000 comprising a processing unit 1004, a system memory 1006 and a system bus 1008. The system bus 1008 couples system components comprising the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is to be appreciated that the embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically comprises other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10 BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
receiving, by network equipment comprising a processor and from a first network management device associated with a first network slice, an on-demand request for a network resource of a second network slice, wherein the on-demand request is based on a determination by the first network management device that, based on a presence of a condition, an access to the network resource of the second network slice facilitates a performance of a task related to a communication service provided via the first network slice, wherein the first network slice comprises first network elements that perform functions that enable the communication service, and wherein the second network slice is a dedicated, high performance network slice that comprises second network elements that augment the functions of the first network elements;
determining, by the network equipment, the network resource comprises a capability to satisfy the on-demand request;
determining, by the network equipment, a location of the network resource; and
facilitating, by the network equipment, transmission of the on-demand request to a second network management device associated with the second network slice, wherein the second network management device manages the network resource, and wherein the second network management device, based on the on-demand request, sends to the first network management device authorization information authorizing a grant of access to the network resource.

2. The method of claim 1, wherein the network resource facilitates maintenance of a quality of service specification related to the communication service.

3. The method of claim 1, wherein the network resource facilitates fulfillment of a bandwidth specification related to the communication service.

4. The method of claim 1, wherein the on-demand request comprises a request to lease the network resource.

5. The method of claim 1, wherein the communication service relates to provision of video data.

6. The method of claim 1, wherein the task comprises streaming video data for the communication service at a higher rate of transmission than a current rate of transmission of video data.

7. The method of claim 1, wherein the condition comprises a query for information.

8. The method of claim 1, wherein the task relates to an analysis of information related to the communication service.

9. The method of claim 1, wherein the task relates to an access of data stored on a repository and a retrieval of the data from the repository.

10. A device, comprising:
a processor; and
a memory that stores executable instructions that, when executed by the processor, facilitate performance of operations, comprising:
in response to an emergency event, determining that access to an additional network resource of a first network slice, beyond a current group of network resources of a second network slice, is necessary to facilitate a performance of a task related to a communication service provided via the second network slice, wherein the second network slice comprises first network elements that perform respective functions that enable the communication service, and wherein second network elements of the first network slice supplement the respective functions of the first network elements;
based on the determining, transmitting a request to a managing gateway device that communicates with a network management device that manages additional resources, comprising the additional network resource; and
receiving, from the network management device, an authorization to access the additional network resource via the first network slice, wherein the authorization is an on-demand authorization implemented on a per needed basis based on the emergency event.

11. The device of claim 10, wherein the determining comprises determining whether the first network elements of the second network slice are capable of carrying out the task in accordance with a level of service.

12. The device of claim 10, wherein the managing gateway device forwards the request to the network management device based on a determination of capabilities of the additional resources are managed by the network management device.

13. The device of claim 10, wherein the communication service comprises a notification service that transmits notifications related to the emergency event.

14. The device of claim 10, wherein the emergency event comprises a security-related incident related to a denial of service attack on the communication service.

15. The device of claim 10, wherein the task comprises performance of a security function comprising an inspection of data to detect a security risk.

16. A non-transitory machine-readable medium, comprising executable instructions that, when executed by a processor, facilitate performance of operations, comprising:
receiving a message comprising an authorization request to use a network resource associated with a first network slice, wherein the authorization request is based on a determination by a network management device of a second network slice, in response to a presence of an emergency condition, that the network resource facilitates a performance of a task related to a communication service provided by the second network slice managed by the network management device, wherein the second network slice comprises first network elements with respective functions that enable the communication service, and wherein the first network slice comprises second network elements that complement the respective functions of the first network elements in response to the emergency condition;
transmitting an authorization to the network management device granting an access to the network resource; and
releasing use of the network resource based on receipt of a transmission indicating that the emergency condition is discontinued and the network resource is no longer being used to facilitate the performance of the task.

17. The non-transitory machine-readable medium of claim 16, wherein the message was received from a managing gateway device in response to the managing gateway device determining that the network resource is equipped to facilitate performance of the task.

18. The non-transitory machine-readable medium of claim 16, wherein the transmitting the authorization is based on a provisioning policy relating to the use of the network resource.

19. The non-transitory machine-readable medium of claim 18, wherein the provisioning policy comprises a subscriber level agreement representative of a billing arrangement associated with the network management device.

20. The non-transitory machine-readable medium of claim 19, wherein the subscriber level agreement specifies a quality of service level to be provided by the communication service to a customer entity.

* * * * *